United States Patent
Frank

(10) Patent No.: US 6,368,205 B1
(45) Date of Patent: Apr. 9, 2002

(54) VOICE MAILBOX IN A GSM-SYSTEM

(75) Inventor: Robert Frank, Stockholm (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/530,595

(22) PCT Filed: Nov. 3, 1998

(86) PCT No.: PCT/SE98/01987

§ 371 Date: Oct. 26, 2000

§ 102(e) Date: Oct. 26, 2000

(87) PCT Pub. No.: WO99/25108

PCT Pub. Date: May 20, 1999

(30) Foreign Application Priority Data

Nov. 6, 1997 (SE) ............................................... 9704057

(51) Int. Cl.$^7$ ............................................... H04M 11/10
(52) U.S. Cl. ..................... 453/413; 455/414; 455/417; 455/557; 455/466; 455/412; 379/88.13; 379/88.16; 379/88.17
(58) Field of Search ................................. 455/712, 413, 455/414, 466, 418, 419, 426, 556, 557; 370/352, 358; 379/88.13, 88.14, 88.17; 709/206, 207

(56) References Cited

U.S. PATENT DOCUMENTS

| | | | | |
|---|---|---|---|---|
| 4,918,722 A | * | 4/1990 | Duehren et al. ............. | 379/100 |
| 5,065,427 A | * | 11/1991 | Godbole ...................... | 379/100 |
| 5,177,780 A | * | 1/1993 | Kasper et al. ................. | 379/59 |
| 5,483,580 A | * | 1/1996 | Brandman et al. ............. | 379/88 |
| 5,487,100 A | * | 1/1996 | Kane ............................ | 379/57 |
| 5,590,178 A | | 12/1996 | Murakami et al. | |
| 5,675,507 A | * | 10/1997 | Bobo, II .................. | 364/514 R |
| 5,802,466 A | * | 9/1998 | Gallant et al. ............... | 455/413 |
| 6,014,559 A | * | 1/2000 | Amin .......................... | 455/413 |
| 6,061,570 A | * | 5/2000 | Janow ......................... | 455/458 |
| 6,094,574 A | * | 6/2000 | Vance et al. ................. | 455/415 |

FOREIGN PATENT DOCUMENTS

| | | |
|---|---|---|
| EP | 0 783 219 | 7/1997 |
| EP | 0 792 077 | 8/1997 |

* cited by examiner

Primary Examiner—William Trost
Assistant Examiner—Marceau Milord
(74) Attorney, Agent, or Firm—Oblon, Spivak, McClelland, Maier & Neustadt, P.C.

(57) ABSTRACT

A mobile communication system which includes mobile terminals with a voice mailbox function. The mobile terminals are equipped with mobile-adapted WWW-browsers. The voice mailbox function provides one or more functions in the form of being able to download at least one home page into a WWW-browser of the mobile terminals.

9 Claims, 1 Drawing Sheet

VOICE MAILBOX IN A GSM-SYSTEM

BACKGROUND OF THE INVENTION

1. Field of the Invention

The present invention relates to a mobile communication system including mobile terminals with voice mailbox function.

2. Background Art

Mobile operators today have the function voice mailbox in their networks, where a voice message can be recorded to a mobile subscriber which is not accessible. The voice mailbox subscriber can have a personal greeting recorded which is played to the calling telephone user, who then can provide a greeting. When the subscriber of the voice mailbox switches on his/her telephone, he/she will have a message, via SMS, that a voice message is to be collected.

It is, however, difficult for a subscriber to give detailed information or information directed to a specific receiver, because the recorded message soon will be of an unwieldy length. The same problem of course applies to the the calling subscriber who shall speak to get a message recorded to the absent subscriber. Especially difficult will it be when complicated information with, for instance, figures, or name difficult to spell, shall be transferred.

SUMMARY OF THE INVENTION

The aim of the present invention consequently is to provide an extensive, easy to understand, and well structured transfer of information between a calling mobile A-subscriber and a not accessible mobile B-subscriber.

This aim is achieved by a mobile communication system including mobile terminals with voice mailbox function, at which mobile-adapted WWW-browsers are implemented in the mobile terminals, and that the voice mailbox function provides one more function in the form of at least one home page which can be downloaded into the WWW-browsers of the mobile terminals.

Because the calling mobile subscriber gets the home page of the not accessible mobile subscriber downloaded in his/her mobile terminal, the calling mobile subscriber will have extensive, well structured, text information regarding the not accessible subscriber.

The calling subscriber then can, by means of the number display of his/her mobile terminal, transmit an extensive text message to the, for the time being, not accessible subscriber. This, of course, will considerably increase the service value of the voice mailbox. Prototypes of mobile terminals, which manage the functionality that the invention requires, already exist. The system may be possible to introduce during 1998.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF AN EMBODIMENT OF THE INVENTION

Figure 1:
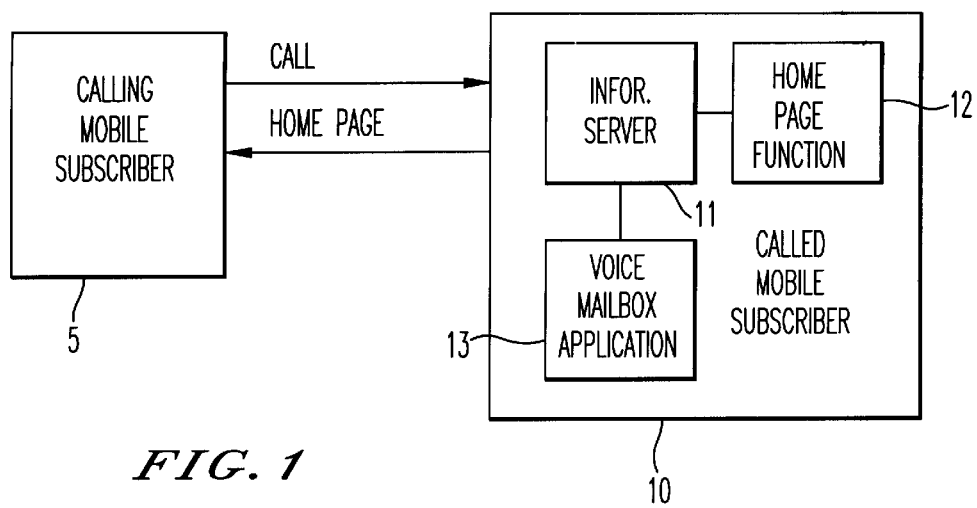
FIG. 1 shows an overall system view of the present invention.
Figure 2:
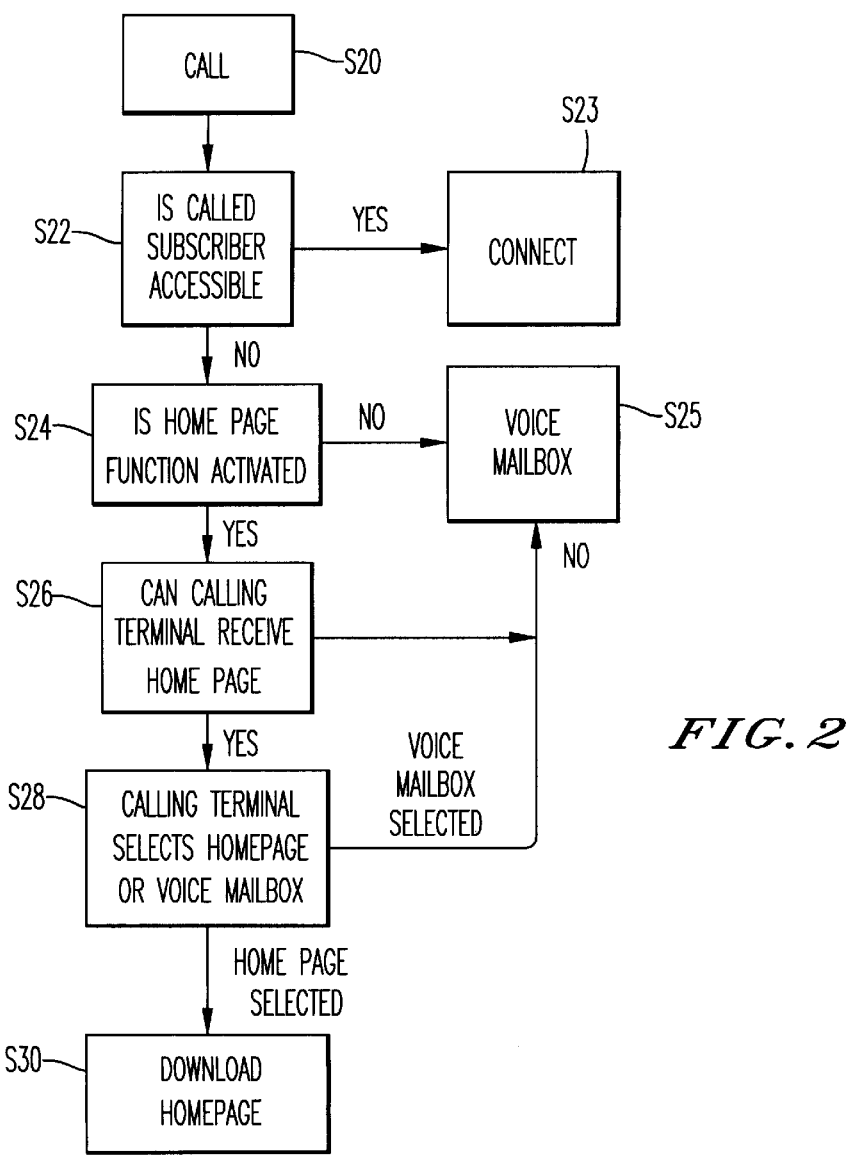
FIG. 2 shows a flow chart control in the present invention.

With reference to FIGS. 1 and 2 the invention requires that an information server 11, where subscribers can download their personal home page with information and hypertext-links, is added to the "common" voice mailbox 13 function. If a GSM-mobile 5 calls a not accessible subscriber 10 (steps S20 and S22), and the home page function 12 is activated in the voice mailbox application (yes in step S24), the calling mobile 5 user will have a voice message requesting to wait while the home page is downloaded to the mobile. Downloading can be executed either via SMS or USSD, which both can transfer data at the same time as a call is going on.

Via A-number presentation, the server 11 can transmit an SMS with the home page information to the calling mobile 5 (step S30). Via A-number-analysis, the home page function 12 also in most cases can find out whether the calling customer 5 has a GSM-mobile which can receive the home page information (step S26) this will not apply if, for instance, personal numbers are introduced, where the same telephone number can be used for a number of different systems). If the A-subscriber's system can be identified to be a common telephone or, for instance, NMT (no in step S26), the calling customer is always connected to the common voice mailbox (step S25).

The mobile subscriber 10 can select which of the two functions that a calling mobile 5 shall reach (step S24), either the common voice mailbox (no in step S24, step S25), or the home page function (yes in step S24), but by means of DTMF-signalling or USSD and voice message, also the calling customer 5 would be able to select which of the functions he/she wants (step S28). Another alternative is that a home page is downloaded at the same time as the calling customer listens and uses the absent subscriber's classic voice mailbox.

If the GSM-mobile which is calling is of an older type, which does not support the mobile-adapted WWW-functionality, it will receive the information as one or more common SMS, where the text will be quite legible. An answer to the absent subscriber then can be written and transmitted as a common SMS to the home page, or directly to the absent subscriber's mobile. This is solved by the SMS from the home page function containing a "reply requested".

The invention is characterized in:
that a voice mailbox function can be developed by a server for mobile-adapted WWW-service being connected to the voice mailbox-application, which makes it possible to transmit a home page to the calling subscriber 5;
that the voice mailbox subscriber can decide if only classic voice mailbox shall be used, if only home page to the calling customer shall be used, if home page shall be transmitted to the mobile at the same time the calling subscriber uses the classic voice mailbox, or if the calling subscriber shall be able to select between classic voice mailbox and home page by means of DTMF-or USSD-signalling;
that the home page function via A-number analysis can decide to which subscriber the home side information shall be transmitted;
that the home page information is transmitted to the mobile via USSD or SMS, which both can be transmitted while the call is going on;
that A-number analysis decides whether the calling customer's terminal supports SMS or USSD, so that the home page message is not transmitted to, for instance, a PSTN-subscriber, and that the classic voice mailbox is activated. If the calling customer does not have a GSM-terminal, but yet has similar messaging functionality, for instance IS136 D-APMS and IS95 CDMA, also this can be decided via A-number analysis. That results in that the function is not limited to GSM;

that a voice mailbox subscriber can have a number of different home pages, for instance one default and some which are aimed at specific calling subscribers which, on basis of A-number analysis, are selected depending on customer. Alternatively, access to certain "hypertext"-links on the home page can be connected to specific A-numbers. In both cases the voice mailbox subscriber can arrange lists with A-numbers which are connected to specific information.

The invention can be used to transfer extensive and advanced information to an A-subscriber when a B-subscriber is not accessible. The invention can be used to differentiate the service offering between different operators.

In present implementations of a voice mailbox, information to the A-subscriber consequently only consists of a recorded voice message, whereas a voice mailbox with home page function in addition can transfer text information and "hypertext"-links to more directed information to the calling subscriber.

The above described is only to be regarded as an advantageous embodiment of the invention, and the extent of protection of the invention is only defined by what is indicated in the following patent claims.

What is claimed is:

1. A mobile communication system comprising:
    (a) a plurality of mobile terminals, each mobile terminal including
        (a1) a voice mailbox function, and
        (a2) a mobile adapted WWW-browser, and
    wherein said voice mailbox function of a called mobile terminal includes at least one home page configured to be downloaded into the WWW-browser of a calling mobile terminal, and an information server configured to download said at least one home page with information of hypertext-links, and if said called mobile terminal is not accessible, said at least one home page is configured to be transferred to said calling mobile terminal.

2. A mobile communication system according to claim 1, wherein said voice mailbox function performs A-number analysis to decide to which mobile terminal said at least one home page is to be transferred.

3. A mobile communication system according to claim 1, wherein said home page is transferred by USSD or SMS.

4. A mobile communication system according to claim 1, wherein said voice mailbox function of said called mobile terminal performs A-number analysis to decide whether the calling mobile terminal supports SMS or USSD, and if said calling mobile terminal does not support SMS, USSD, a common voice message, and not said at least one home page, is transferred to said calling mobile terminal.

5. A mobile communication system according to claim 1, wherein said calling mobile terminal by DTMF- or USSD-signalling determines whether said at least one home page or a voice message is to be transferred from a not accessible called mobile subscriber to said calling mobile terminal.

6. A mobile communication system according to claim 1, wherein said voice mailbox function of said called mobile terminal includes a plurality of different home pages, and said plurality of different home pages are configured to be transferred to different calling mobile terminals, which different calling mobile terminals are identified by A-number analysis.

7. A mobile communication system according to claim 6, wherein said voice mailbox function of said called mobile terminal is programmed with lists containing A-numbers indicating connections to different home pages or hypertext-links.

8. A mobile communication system according to claim 1, wherein hypertext-links on said at least one home page are connected to different calling mobile terminals, which are identified by A-number analysis.

9. A mobile communication system according to claim 8, wherein said voice mailbox function of said called mobile terminal is programmed with lists containing A-numbers indicating connections to different home pages or hypertext-links.

* * * * *

UNITED STATES PATENT AND TRADEMARK OFFICE
CERTIFICATE OF CORRECTION

PATENT NO. : 6,368,205 B1
DATED : April 9, 2002
INVENTOR(S) : Frank et al.

It is certified that error appears in the above-identified patent and that said Letters Patent is hereby corrected as shown below:

<u>Title page,</u>
Items [12] and [75], the Inventors' information should read:
-- [12]  United States Patent
         Frank et al.

[75]  Inventors: Robert Frank, Stockholm (SE);
                   Mats Olof Winroth, Poing (DE) --

Signed and Sealed this

Eighth Day of October, 2002

*Attest:*

*Attesting Officer*

JAMES E. ROGAN
*Director of the United States Patent and Trademark Office*